July 5, 1960
R. VIKEN
2,943,415
TOY CONSTRUCTION
Filed Dec. 26, 1957
Fig.1.
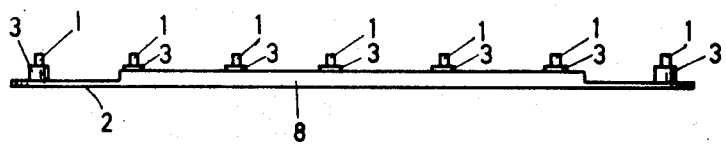
Fig.2.
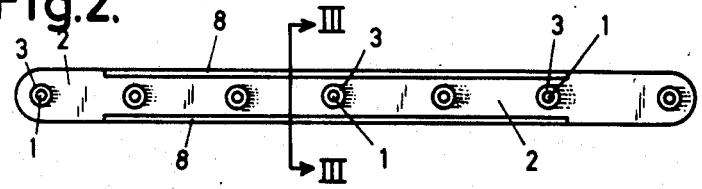
Fig.4.
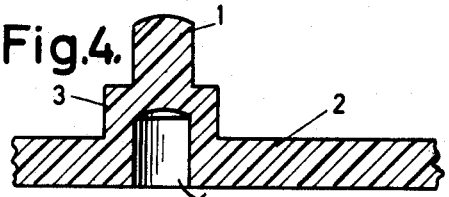
Fig.3.
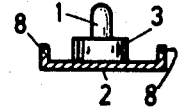
FIG.7.
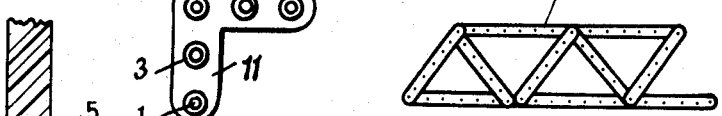
Fig.6.
Fig.8.
Fig.5.
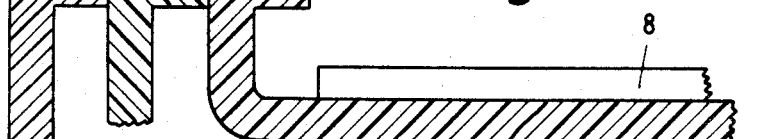
INVENTOR.
Reidar Viken
BY
Eric J. Munson
Attorney

United States Patent Office 2,943,415
Patented July 5, 1960

2,943,415

TOY CONSTRUCTION

Reidar Viken, Aaslandsgate, Kongsberg, Norway

Filed Dec. 26, 1957, Ser. No. 705,293

2 Claims. (Cl. 46—28)

The present invention relates to a constructional element primarily used as toys and the elements are adapted to be assembled to make models of different kinds, and such as bridges, towers, cranes, ships, etc. with a very lifelike appearance.

The first kits of this type were, as far as known, the so-called "Meccano"-kits consisting of suitably shaped metal parts provided with series of holes, and the parts were assembled by means of screws and nuts.

These screws and nuts and other small connecting parts were, however, very easy to lose, and as a result other embodiments of such constructional kits were suggested, in which the securing means for assembling the elements were permanently attached to the same. One proposed design for the attaching means contemplated providing the metallic elements with attaching means of the snap fastener type in the form of snap fastener elements as known per se. One disadvantage of such constructional elements is, however, that difficulties will arise in the assembly of two elements when two male or two female snap fastener parts are to be joined, as the previously known elements alternately were provided with male and female parts spaced from each other. In spite of the fact that these constructional elements eliminated the disadvantage of loose screws and nuts, these constructional elements were not used to a considerable extent because the possibilities of combining the elements were very limited.

The object of the present invention is to provide a constructional element where no screws or nuts are used for the assembly, and said elements may freely be assembled without any limitation of the possibilities for joining them together, and this is in accordance with the invention, achieved by providing the constructional element at each attachment point with both a male and female member of a snap fastener.

The invention thus consists in an improvement in constructional elements for building toy models, shaped as an elongated part with a number of securing means for attaching one element to another, said securing means being in the shape of a snap fastener, and the invention is mainly characterized in that male and female snap fastener members are provided in alignment with each other, preferably along the longitudinal axis of the constructional element, the male part or parts being provided on one side of the element, while the female parts of the snap fastener face the opposing side.

A further feature of the invention consists in that each male securing member is provided on an extended section which encloses the female part of the securing means, the opening of which being remote from the male member.

In order to reinforce the constructional element without undue increase in weight, the element may further, in accordance with the invention, be provided along the edges of one or both sides with ribs which increase the rigidity of the element, and in order to avoid use of specially-formed small parts when the elements are to be attached to each other in corners or angles, the ribs may be terminated at a small distance from the ends of the element, thus enabling the end portion to be bent when assembling elements at an angle to each other.

Due to the fact that elements of metal are likely to fracture after being bent a few times, the constructional element, in accordance with the invention, is preferably made from a material which withstands being bent repeatedly without breaking, for example, suitable plastic material, and to increase the force locking the elements together the male and female securing members may be conical or extended.

One embodiment of a constructional element in accordance with the invention is shown on the drawing on which:

Fig. 1 is a side view of the constructional element;

Fig. 2 is a top view of the same element;

Fig. 3 is a section taken along the line III—III of Fig. 1;

Fig. 4 is a view of a detail of the securing means on an enlarged scale;

Fig. 5 is an example of how a number of constructional elements may be joined together at one and the same point;

Fig. 6 is a view of a simple structure, constructed from elements designed in accordance with the invention;

Fig. 7 is a plan view of an angle-piece embodying the improvements, and

Fig. 8 is a sectional view of a modified construction.

The constructional element may, as shown in Figs. 1 and 2 have an elongated shape or be in the form of a strip which to a certain extent may be compared with corresponding parts of metal, e.g. the so-called "Meccano"-parts. Instead of holes for joining the elements together these elements are provided on one side with male securing means 1 forming one element of a snap fastener. In the embodiment shown the constructional element 2 is in strip form of comparatively thin, flexible material, the male member 1 being a reduced-diameter part attached to or formed integrally with an extension 3 which encloses the female member.

A snap fastener is shown more in detail in Fig. 4 in which 2 indicates the constructional element or strip and 1 is the male member of the fastener. The cylindrical extension 3 is preferably formed integrally with the strip and is provided with a hole 4, the size of which corresponds to the male member 1 of the element which is to be secured to the constructional element shown in Fig. 4. The male member 1 and the female member 4 are positioned in alignment with each other i.e. the axis of the hole 4 corresponds to the axis of the male member 1. This arrangement of the male and female members enables assembly of a number of elements at one and the same point, an assembly which previously has been impossible. Fig. 5 shows an example in which three constructional elements in accordance with the invention, referred to as 5, 6 and 7 are joined together. The element 5 extends upwardly, the element 6 downwardly and the element 7 is bent at an angle.

If desired, the element 5 might very well be placed inside the element 6 or the elements might be interchanged in other ways so that the appearance of the toy model will be life-like and give a technically correct result. To reinforce the constructional elements along both edges, they are provided at each of said edges with a rib or flange 8 as shown in Figs. 1 and 2 and in the section in Fig. 3.

The ribs or flanges 8 are terminated at a certain distance from the opposite ends of the constructional elements and this feature enables two elements to be put together at angles to each other or in corners as shown in Fig. 5, where the constructional element 7 is bent.

These elements avoid use of small additional angular elements or similar elements required in known kits of this kind and an unlimited number of toy models may be constructed with only one type of constructional element.

Fig. 6 shows, as an example, a simple structure assembled from constructional elements 9 but as stated, an unlimited number of models may be built and these may, if required, be provided with wheels by means of bearings or similar elements which may be attached to the other elements by means of a similar snap fastener system.

In the illustrated embodiment of the invention, the element 2 consists of an elongated strip of flexible material, such as plastic, rubber or the like, reinforced and stiffened along its opposite longitudinal edges by the flanges 8 which terminate short of the opposite ends of the strip, providing opposite end portions on the strip of flexibility greater than the central portion of the strip. The connection elements may be integrally-formed cylindrical stud-like extensions having large-diameter base portions 3 and reduced-diameter cylindrical parts 1, the latter constituting the male elements of snap fasteners. Formed in the base portions of the connection elements are apertures which open at the face of the strip opposite to that from which the connection members project, so that the male fastener members are available for engagement on one side of the strip and the female members accessible on the opposite side of the strip.

The example shown will only serve to illustrate the invention and does not constitute a limitation as other modifications may be possible, for example, the elements may be shorter or longer than the ones shown and further the elements may, if necessary, have greater thickness so that neither the ribs or flanges 8, nor the extensions 3 at one end of the male members 1 will be required. This and other embodiments will, however, be well within the scope of the invention as long as the two parts of a snap fastener are positioned in the same point on a common axis.

The strip containing the connecting elements need not necessarily be straight, but might be made curved or angular, an example of the latter form being shown in Fig. 7. There the arms 10 and 11 of the piece are integral and at right angles to one another and each provided with the two-diameter studs 1 and 2 as disclosed in Fig. 4.

In Fig. 8 another embodiment of the invention is shown, wherein the base or strip portion 2 is made of sufficient thickness to permit the female members to be formed directly in it instead of in cylindrical extensions of the strip. These and other embodiments are believed to be within the scope of the invention and the claims appended hereto.

What I claim is:

1. A toy construction member comprising a strip provided on one of its faces with a plurality of projecting stud members, each of said stud members being provided with a relatively large diameter base portion and a cylindrical reduced-diameter end, said reduced diameter end constituting the male member of a snap fastener, each of the stud members being provided with a recess extending partly through its base portion, said recess opening at the back of the strip and being of a size to receive the reduced diameter portion to thereby constitute the female member of a snap fastener, whereby the male member is located on one face of the strip and the female member is directly behind the male member and is accessible from the opposite face thereof.

2. In a toy construction member as provided for in claim 1, wherein the strip is reinforced along its opposite longitudinal edges by flanges which extend for a portion only of the length of the strip, said flanges terminating short of the opposite ends of the strip to thereby provide flexible parts of the strip adjacent to said opposite ends.

References Cited in the file of this patent
UNITED STATES PATENTS

| 1,212,700 | Smith | Jan. 16, 1917 |
| 2,013,771 | Tompkins | Sept. 10, 1935 |

FOREIGN PATENTS

| 160,228 | Great Britain | Mar. 8, 1921 |